United States Patent
Clayman et al.

(10) Patent No.: US 6,644,551 B2
(45) Date of Patent: Nov. 11, 2003

(54) CARD

(75) Inventors: Adelbert James Clayman, Streetsboro, OH (US); Thomson Ching-Tai Lee, Solon, OH (US)

(73) Assignee: G + D Cardtech, Inc., Twinsburg, OH (US)

(*) Notice: Subject to any disclaimer, the term of this patent is extended or adjusted under 35 U.S.C. 154(b) by 12 days.

(21) Appl. No.: 09/990,946

(22) Filed: Nov. 9, 2001

(65) Prior Publication Data

US 2003/0116633 A1 Jun. 26, 2003

(51) Int. Cl.$^7$ ............................................... G06K 19/02
(52) U.S. Cl. ....................................................... 235/488
(58) Field of Search ................................. 235/492, 375, 235/380, 457, 381, 493, 488, 487

(56) References Cited

U.S. PATENT DOCUMENTS

| | | | |
|---|---|---|---|
| 3,494,818 A | 2/1970 | Marchese | 161/3 |
| 3,660,190 A | 5/1972 | Stroszynski | 156/150 |
| 3,809,568 A | 5/1974 | Askew | 117/38 |
| 4,215,170 A | 7/1980 | Vilaprinyo Oliva | 428/328 |
| 4,318,554 A | 3/1982 | Anderson et al. | 283/7 |
| 4,479,995 A | 10/1984 | Suzuki et al. | 428/203 |
| 4,497,872 A * | 2/1985 | Hoppe et al. | 283/107 |
| 4,538,059 A * | 8/1985 | Rudland | 235/462.01 |
| 4,686,133 A | 8/1987 | Nakabayashi et al. | 428/209 |
| 4,687,231 A | 8/1987 | Hartmann | 283/82 |
| 4,747,620 A * | 5/1988 | Kay et al. | 283/86 |
| 4,897,533 A | 1/1990 | Lyszczarz | 235/487 |
| 5,037,101 A * | 8/1991 | McNulty | 273/139 |
| 5,107,470 A * | 4/1992 | Pedicano et al. | 116/200 |
| 5,120,589 A | 6/1992 | Morikawa et al. | 428/76 |
| 5,364,482 A | 11/1994 | Morikawa et al. | 156/182 |
| 5,626,937 A | 5/1997 | Morikawa et al. | 428/76 |
| 5,928,788 A * | 7/1999 | Riedl | 156/219 |
| 5,988,503 A * | 11/1999 | Kuo | 235/457 |
| 6,025,283 A | 2/2000 | Roberts | 442/15 |
| 6,328,340 B1 * | 12/2001 | Fischer | 283/101 |
| 6,402,039 B1 * | 6/2002 | Freeman et al. | 235/375 |

FOREIGN PATENT DOCUMENTS

| | | |
|---|---|---|
| GB | 1264712 | 2/1972 |
| JP | 02002067554 A * | 3/2002 |

* cited by examiner

*Primary Examiner*—Thien M. Le
(74) *Attorney, Agent, or Firm*—Brouse McDowell; Timothy D. Bennett

(57) ABSTRACT

The present invention is directed to an improved card structure, which employs at least two polyester layers and is useful as, e.g., a credit card, shopping card, pre-paid card, identification card, or the like. An additional feature is a card which has a metal foil appearance. The card is formed by a lamination process using at least two polyester layers which are joined with a white PVC core layer and are covered with a clear cover layer. The card can be made from laminate substructures and which are subsequently joined by an adhesive layer to form the laminate structure. The cards can be overprinted, embossed, or provided with further components such as holograms, signature pads, magnetic strips, photographic identification strips, or card company identifiers.

30 Claims, 1 Drawing Sheet

CARD

BACKGROUND OF THE INVENTION

The present invention is directed to an improved card, such as a credit card, security card, or the like, and method of making the same. The present invention is also directed to an embodiment where the card is a full face foil card and where the card has a clear, scratch-resistant surface and a metal foil appearance.

Credit cards, as well as other cards such as shopping cards, pre-paid cards, retail store cards, financial cards, insurance cards, travelling cards, transit passes, tickets, personal identification cards, are finding increasingly widespread use. So, efforts have been made to provide these cards with attractive, distinctive appearances to identify, promote or distinguish the company or association which is issuing or supporting the card. Cards having a metallic surface or appearance exist, where the metallic appearance is formed on or beneath the card surface. The metallic appearance may be combined with printed graphics and stamped holograms that are useful for validating cards and supporting their authenticity.

One problem associated with incorporating metal layers in credit cards is effectively securing the metal layer to the body of the credit card and/or providing a protective film over the metallic surface, which protective film will remain bonded without encountering problems in breakage of the thin metallized surface or lack clarity in the overlaminate. Conventional offset lithography printing of a thin metallized surface on a thin plastic substrate, such as a credit card, is also not practical since the details of the graphics, i.e., the fine lines, tend to blur. Processing the laminate of a plastic substrate with a metallized surface is also problematic because the laminate, in effect, can become a capacitor for storing static electricity generated during processes such as printing. Still further, because of the incompatibility of the material use to make metallic or foil faced cards, the cards tend to delaminate over a period of time due to the flexing that takes place as the cards are carried in wallets and/or heat to which the are subjected.

A number of recent patents have claimed to solve the problems of creating a foil card. For example, U.S. Pat. No. 4,897,533 to J. L. Lyszczarc teaches a credit card having a metal layer in the form of a metallic foil overlaid at least substantially over all of a plastic substrate. The foil has printed ink graphics on it formed of an ultraviolet curable ink. A transparent film is located on the metallic foil. U.S. Pat. No. 6,025,283 to W. S. Roberts teaches a charge card made from a rubber or plastic laminate with precious metal forming the upper surface and lower surfaces. The use of a rubber-based material layer provides the flexibility required to meet the standards for a credit card. U.S. Pat. No. 5,120,589 to M. Morikaw, et al. teaches a card made from a precious metal foil composite where the precious metal foil is encased by lamination in a transparent polymeric sheet material. That laminate is then joined together with another component having opaque decorative patterns. Finally, the entire assembly is encased in a secondary hard protective covering to provide the outermost protection. U.S. Pat. No. 4,687,231,000,000 to H. Hartmann teaches an identification card to be read by a magnetic system having two protective plates made from a non-magnetizable metal, preferably sheet bronze. The protective plates are bonded in place using a layer of adhesive plastic or solder to join the layers together.

Additionally, there are various techniques known for joining metals and plastics. For example, U.S. Pat. No. 3,660,190 to J. Stroszynski discloses a process for the manufacturer of a composite material in which a metal layer is deposited on intermediate support and ultimately pressing the ultimate support film against the metal layer while an adhesive layer is interposed between them, to produce a bonded composite having a metal layer.

Some of the problems associated with making cards having a metallic appearance can also be found in other card structures. Upon bringing the appropriate layers together to form a card structure, that structure needs to meet the standards for identification cards or credit cards, such as International Standard ISO 7810-1985. As such, it needs to resist delamination and curling, have enough flexibility to handle the stress of being handled and flexed in wallets, while functioning for a variety of card purposes, including as a credit card.

SUMMARY OF THE INVENTION

The present invention is the result of the discovery that an improved card structure, such as a credit card, debit card, ATM card, shopping card, pre-paid card, security card, identification card, or the like, can be achieved using at least two polyester layers, along with the polyvinyl chloride layers that are traditionally brought together to make a card structure. Further, a card structure having a metal foil appearance can be achieved using a metallized polyester layer. The card structure is achieved by joining at least two polyester layers and polyvinyl chloride ("PVC") layers to form a card structure that will meet the standards for identification cards, such as International Standard ISO 7810-1985, and resist delamination and curling, and yet have enough flexibility to function for a variety of card purposes, including as a credit card. The cards can be overprinted, embossed, or provided with further identifying information components such as holograms, signature panels or pads, magnetic strips, photographic identification strips, contact chips, contactless chips, or a card company identifier(s).

For the purpose of this application, the term "credit card" is intended to include credit cards, as well as debit cards, ATM cards, shopping cards, pre-paid cards, security cards, identification cards, telephone cards, transit passes, travelling cards, personal identification cards, and the like, including cards having functional means such as holograms, signature panels or pads, magnetic strips, photographic identification strips, contact chips, contactless chips, card company identifier(s), and the like for identification, validation, and authenticating.

BRIEF DESCRIPTION OF THE DRAWINGS

For a complete understanding of the objects, techniques, and structure of the invention, reference should be made to the following detailed description and accompany drawings, wherein.

DETAILED DESCRIPTION OF THE INVENTION

The present invention is to an improved card structure, such as a credit card, and a method of making a card. Further, cards can be made having a metal foil appearance.

The card structure is essentially a polyvinyl chloride core, in the form of a card, having first and second faces. The core can be made using a single PVC core, but is preferably made using two layers of PVC where each layer is one-half of the desired thickness of the core structure. Of course, the core could be manufactured using more than two layers of PVC, but the additional manufacturing steps would be less desirable because the additional steps would add to the manufacturing cost. Further, the use of two core layers allows the additional layers and/or printing used to make the card to be joined to a respective half of the core and then each half of the core is joined to make the whole card. Therefore, the process of making the card will be described using two core structures, and it will be appreciated that adjustments will be made when using a single core or multiple core elements.

Figure 1:
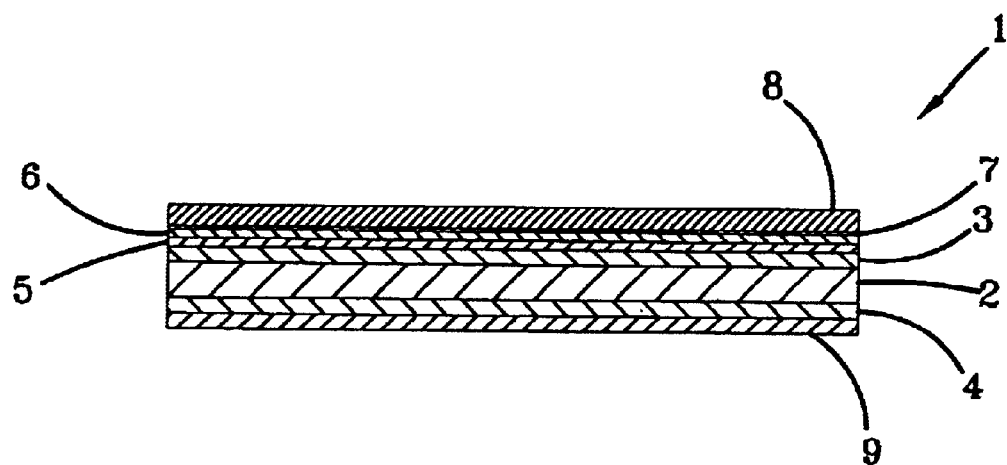
FIG. 1 shows a plan view of a credit card in accordance with the present invention and FIG. 2 shows an exploded view of the card of FIG. 1.
Figure 2:
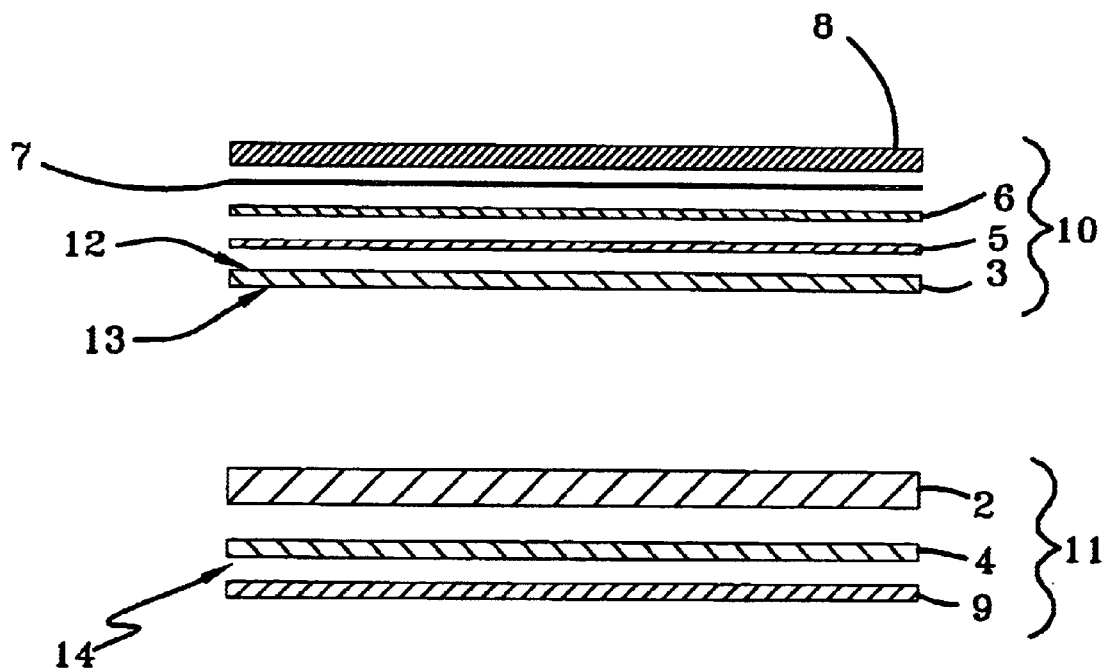

As seen in FIGS. 1 and 2, the card structure 1 is preferably made by laminating the layers to form the substructures 10 and 11 and subsequently joining the substructures to one another. Using a two-part PVC core and selecting one of the two PVC core elements which has two faces, a polyester layer 3 having printing 7 or graphics on it, or to which graphics will be applied, and a clear overlay layer 8 are adhered to a first face 12 of the PVC core element 2. This face can be considered the front of the card. To the second face 13 of the first PVC core element 10 or substructure is adhered a second PVC core element 11 or substructure over which is a second polyester layer 4 and a second clear PVC overlay layer 9. Further printing can be placed between the polyester layer and the clear overlay layer 14, which are bonded to second PVC core element, if desired. To make a card having a metallic appearance, a metallized polyester layer 3 and 5 is adhered to the first face of the first PVC core element 2 instead of the polyester layer 3. Printing and the further identification components are added at appropriate steps in the manufacturing process to tailor the card so that it will serve a specific function, such as a credit card, a shopping card, a pre-paid card, an identification card, or the like. Magnetic information containing panels or pads, as well as signature strips and the like, can be adhered to the face of the clear overlay that covers the second core element. Also, chips, which require contact or are contactless, can be placed upon either or both clear overlay layers, if desired.

The first laminate 10 is made by laminating, using heat and pressure, a white PVC film, which has a thickness of about 0.020 to 0.030 inch, with 0.025 inch being preferred, to a polyester film which has a thickness of about 0.00075 to 0.00125 inch, with about 0.001 inch thick being preferred. For the metallized appearance, the polyester is one to which a layer of metal has been applied by vapor deposition, and the PVC is joined to the polyester side of the film, which leaves the metal film exposed. By conveying the PVC substrate and polyester film between opposed nip rollers, the polyester film is pressed against the PVC substrate. Alternatively, the laminating could be achieved using a hydraulic laminating press. The temperatures and pressures are not critical, and will be in the range of 250° F. to 300° F., with 295° F. being preferred, and a pressure of 250 to 1000 psi, with 250 psi being preferred.

Using the metallized film, the metal covers substantially all of the surface of the polyester and could be any precious metal such as silver, gold or platinum, or other metals such as aluminum or aluminum alloy, although aluminum is preferred because of its relatively low cost. Further, the aluminum may be colored to have a gold, silver, red, green, blue or other colored appearance.

Next, a clear polyester, acrylic, PVC, or epoxy adhesive coating 6 is applied to the polyester surface 3, or to the metal surface 5, if appropriate. The coating could be an ultraviolet curable varnish which is cured by directing ultraviolet light on the varnish. A preferred varnish is SQC clear adhesive, which is available from Sericol Limited. The thickness of the coating is about 1 micro inch to about 4 micro inch, with about 5 micro inch thick being preferred. Alternatively, a clear polyester film could be used which is adhesively bonded to the metal containing layer using a clear heat-activated adhesive, such as a polyethylene adhesive. Once the adhesive coating is applied, any printing is applied to form the desired graphic, e.g., letters, number, pictures, shapes, patterns, etc., or to create the desired metal foil look and provide the desired aesthetics. Next, a clear PVC overlay is bonded over the printing.

The second substructure laminate 11 is made by laminating a white PVC film, having a thickness of about 0.0125 inch to about 0.0135 inch, with about 0.0125 inch being preferred, to a clear polyester film, having a thickness of about 0.001 inch to about 0.002 inch, with about 0.001 inch being preferred, to which is subsequently laminated a clear PVC overlay, having a thickness of about 0.002 inch to about 0.004 inch, with about 0.002 inch being preferred. The polyester is joined using an appropriate heat activated adhesive. If any further graphics are desired they can be applied to the polyester by an appropriate printing technique before the clear PVC overlay is applied. The clear PVC overlay is preferably coated with an adhesive layer which facilitates the bonding step. Such adhesives are commercially available, such as W35 coating, which is preferred, is a preapplied aliphatic polyester, water-based, urethane adhesive coating film and is available from Waytek Corporation.

The second substructure laminate is made by laminating a white PVC film, having a thickness of about 0.0125 inch to about 0.0135 inch, with about 0.0125 inch being preferred, to a clear polyester film, having a-thickness of about 0.001 inch to about 0.002 inch, with about 0.001 inch being preferred, to which is subsequently laminated a clear PVC overlay, having a thickness of about 0.002 inch to about 0.004 inch, with about 0.002 inch being preferred. The polyester is joined using an appropriate heat activated adhesive. If any further graphics are desired they can be applied to the polyester by an appropriate printing technique before the clear PVC overlay is applied. The clear PVC overlay is preferably coated with an adhesive layer which facilitates the bonding step. Such adhesives are commercially available, such as W35 coating, which is preferred, is a preapplied aliphatic polyester, water-based, urethane adhesive coating film and is available from Waytek Corporation.

Optionally, a clear polyester adhesive coating 6 can be applied to the polyester surface 3 to which the print layer 7 is applied. The adhesive coating could be an ultraviolet curable varnish which is cured by directing ultraviolet light on the varnish. If one is employed, a preferred varnish is SQC clear varnish, which is available from Sericol Limited. The thickness of the coating is about 1 micro inch to about 4 micro inch, with about 5 micro inch thick being preferred.

The first 10 and second 11 substructure laminates are then joined by applying a PVC adhesive to one of the exposed white PVC layers of one of the laminates and joining the other laminate at the other white PVC surface by applying heat and pressure. Each of the laminates can be made by continuous process by feeding continuous sheets of the materials or they could be made by forming sheets from which a fixed number of cards could be made. The plastic substrate is preferably in the form of a large sheet containing a plurality of credit cards. For example, the sheet could be of a size that would accommodate eight cards by eight cards or eight by nine or eight by ten. Once the first and second laminates are joined, the cards can be die cut from the laminate sheets.

Identifying information means can be attached to each card. The identifying information means could be a magnetic tape which is attached to the card on a surface of the plastic substrate opposite the metallic surface of the substrate by a known hot stamping process, a roll or heat transfer process or a laminating process, or it could be a signature panel or tape, a hologram, a photographic identification, a contact chip, a contactless chip, or the like.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What is claimed is:

1. An improved credit card structure comprising a plastic substrate core in the form of a card and having first and second faces which are substantially parallel, at least two polyester layers overlaying at least substantially all of the first and second faces of said plastic substrate, and transparent films overlaying said polyester layers;
   wherein one of said polyester layers is overprinted; and
   wherein one of said polyester is coated with an adhesive prior to printing.

2. The improved card structure of claim 1 wherein the plastic substrate is at least one layer of polyvinyl chloride.

3. The improved card structure of claim 1 wherein the transparent films are polyvinyl chloride.

4. The improved card structure of claim 1 wherein said card has attached to it further elements selected from the group consisting of holograms, signature pads, magnetic strips, photograph identification strips, embedded electronically readable microchip card company identifiers, or combinations thereof.

5. The improved card structure of claim 1 wherein said card has the ability to function in electronically readable environments.

6. The improved card structure of claim 1 wherein said card has high levels of security applicable to payment and non-payment for identification-type cards and credit cards.

7. The improved card structure of claim 1 wherein said card is embossed, thermal graphic printed, laser engraved, or flat graphics printed.

8. An improved foil face credit card structure comprising a plastic substrate in the form of a card and having first and second surfaces, a metallized polyester layer overlayed on and covering substantially all of a first surface of said plastic substrate, and a transparent film overlaying said metallized polyester layer;
   wherein said plastic substrate is bonded to the polyester surface of metallized polyester layer; and
   wherein said metallized polyester is overprinted and is coated with an adhesive prior to printing.

9. A card structure according to claim 8 wherein said card has further components selected from the group consisting of holograms, signature pads, magnetic strips, photograph identification strips, embedded electronically readable microchip card company identifiers, or combinations thereof.

10. A card structure according to claim 8 wherein said card has the ability to function in electronically readable environments.

11. A card structure according to claim 8 wherein said metallized polyester layer is aluminized polyester.

12. A card structure according to claim 8 wherein said plastic substrate is at least one layer of polyvinyl chloride.

13. A card structure according to claim 8 wherein said plastic substrate is at least one layer of polyvinyl chloride to which is joined a layer of polyester film.

14. A card structure according to claim 8 wherein said plastic substrate is at least one layer of polyvinyl chloride to which is joined a layer of polyester film over which is a clear polyvinyl chloride film.

15. A card structure according to claim 8 wherein said metallized polyester layer is a polyester film on which a metal has been vapor deposited.

16. A card structure according to claim 8 wherein said metallized polyester layer is a polyester film on which a metal has been vapor deposited and said plastic substrate is bonded to the polyester surface of metallized polyester layer.

17. A card structure according to claim 8 wherein the possibility of creating a stock or originated full size of repeating holographic image is applied.

18. A card structure according to claim 8 wherein card meets or exceeds the requirements of standard ISO 7810.8.1.8.

19. A card structure according to claim 8 wherein embossing, thermal graphics printing, or laser engraving or flat graphics is possible.

20. A card structure according to claim 8 wherein the card has high levels of security applicable to payment and non-payment for identification-type cards and credit cards.

21. A method of making an improved credit card comprising
   A. Making a first laminate by laminating, using heat and pressure, a white PVC film to a polyester film,
   B. Applying, to the exposed surface of the polyester film a clear PVC film,
   C. Making a second laminate by laminating a white PVC film to a clear polyester film,
   D. Laminating a clear PVC overlay over said polyester film,
   E. Applying a PVC adhesive to one of the exposed white PVC layers of one of said first or second laminates, and
   F. Joining the first and second laminates by applying heat and pressure.

22. The method of claim 21 wherein printed ink graphics are applied to the polyester surface of said second laminate prior to laminating said clear PVC overlay.

23. The method of claim 21 wherein identifying information means is attached to said card.

24. The method of claim 21 wherein identification means, selected from the group consisting of magnetic tape, signature tape, hologram, photographic identification, and combinations thereof, is attached to said card.

25. The method of claim 21 wherein identifying information means is applied to said card whereby it can be for use as a shopping card, a pre-paid card, a retail store card, a financial card, insurance cards, travel cards, a transit pass, a ticket, a telephone card, or a personal identification card.

26. A method of making an improved foil face credit card comprising

A. Making a first laminate by laminating, using heat and pressure, a white PVC film to a metallized polyester film, to which a layer of metal has been applied by vapor deposition on one side there of, the PVC film being joined to the polyester side of the metallized polyester film, B. Applying, to the exposed metal surface of the metallized polyester film a clear PVC film, C. Making a second laminate by laminating a white PVC film to a clear polyester film, D. Laminating a clear PVC overlay over said polyester film, E. Applying a PVC adhesive to one of the exposed white PVC layers of one of said first or second laminates, and F. Joining the first and second laminates by applying heat and pressure.

27. The method of claim 26 wherein the metal is selected from the group consisting of gold, silver, platinum, aluminum, and aluminum alloys.

28. The method of claim 26 wherein the metal is aluminum or aluminum alloy.

29. The method of claim 26 wherein the metal is aluminum or aluminum alloy that has been colored.

30. The method of claim 21 wherein an adhesive is applied to the exposed metal surface and printed ink graphics are applied thereto.

* * * * *